United States Patent Office 3,525,540
Patented Aug. 25, 1970

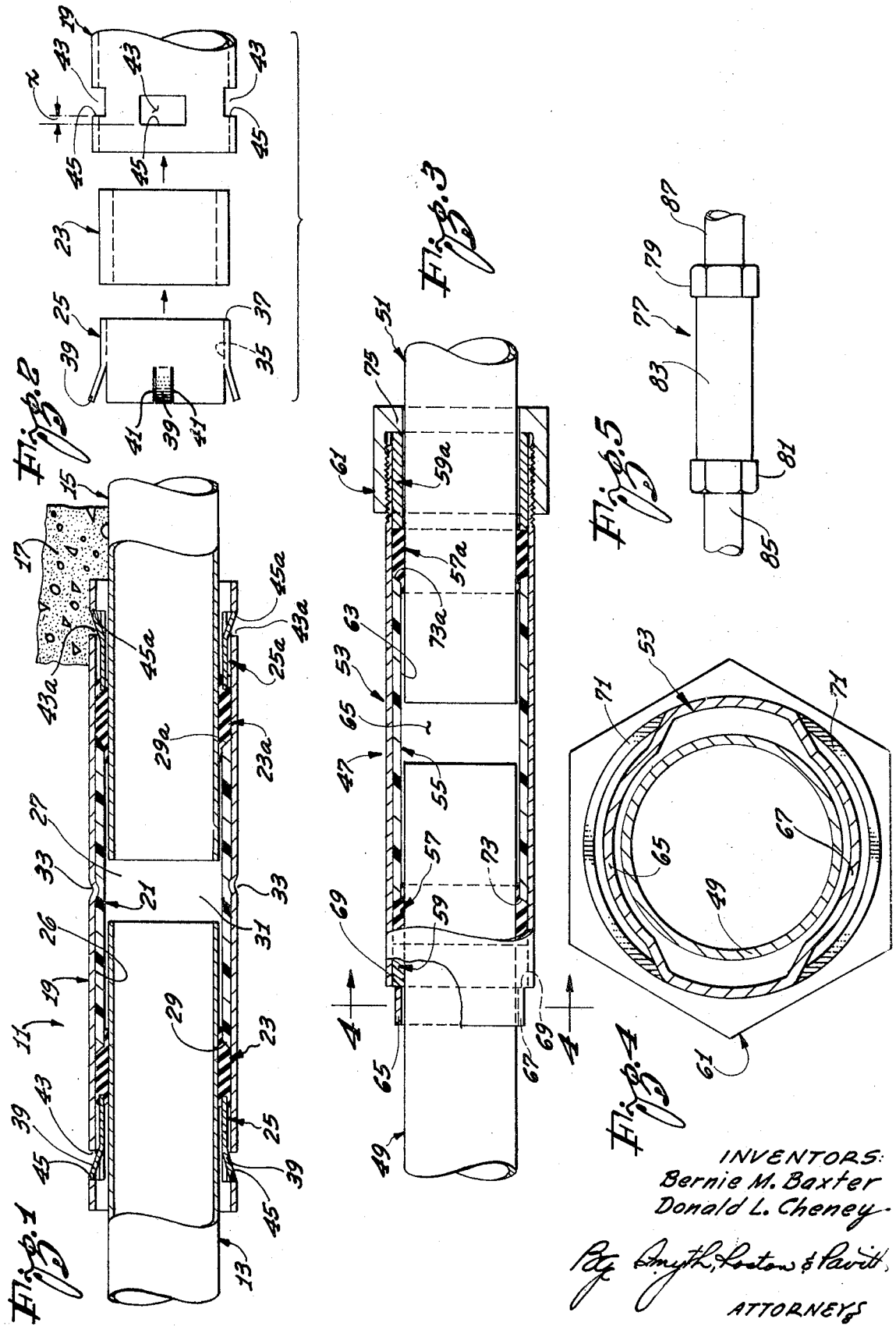

**3,525,540
COUPLING**
Bernie M. Baxter, 2027 W. Berridge Lane, Phoenix, Ariz. 85015, and Donald L. Cheney, 1319 E. Howell St., Seattle, Wash. 98122
Filed May 13, 1968, Ser. No. 728,468
Int. Cl. F16i 3/00
U.S. Cl. 285—64                        16 Claims

ABSTRACT OF THE DISCLOSURE

This disclosure describes a coupling for use in joining first and second tubing sections. In the embodiment illustrated, the coupling includes an outer tubular member adapted to receive end portions of the first and second tubing sections, an insert within said outer tubular member defining first and second shoulders, and deformable ring members within the outer tubular member. The ring members are radially expanded by urging them against the shoulders of the inner tubular member to cause the deformable rings to frictionally grip the tubing sections to thereby frictionally retain the tubing sections within the outer tubular member.

BACKGROUND OF THE INVENTION

It is often necessary to connect tubular members such as tubing sections, electrical conduits, etc., and if the tubular members are to carry a fluid, the joint should be fluid tight. One approach is to connect tubing sections by means of a coupling which uses deformable rings. The deformable rings are axially compressed to thereby radially expand the deformable rings into frictional engagement with the adjacent tubing section. The frictional engagement between the rings and tubing sections holds the latter within the coupling.

In order to axially compress the deformable ring, it is necessary that the coupling provide an internal shoulder for each of the deformable rings. Heretofore, such shoulders have been formed by swaging the end portions of the coupling housing or by counterboring the coupling housing. Both the swaging and the counterboring operations are objectionable because they substantially increase the cost and production time of an otherwise relatively inexpensive coupling. Counterboring is further undesirable because of the material wasted in the counterboring operation and because the central portion of the coupling is much heavier than is structurally necessary.

Couplings of this type may include three threaded parts which must be joined to connect the tubing sections. As tubing couplings are often used on construction sites where they are subjected to rough handling, the threads not infrequently get banged up to the extent that they cannot be used for their intended purposes or require additional time to install. In other instances, the threads get clogged with sand or concrete so that they become difficult or impossible to use. Even if the threaded coupling parts are not damaged or clogged, the joining of three separate parts using threads takes more time than is desirable particularly when many thousands of such couplings must be interconnected as in dam construction.

SUMMARY OF THE INVENTION

The present invention provides a coupling for connecting tubing sections which is considerably less expensive and much easier to manufacture than prior art couplings of this type. This is accomplished in part by eliminating the need for the relatively costly and time consuming swaging or counterboring operations.

The present invention teaches that these work operations can be eliminated by providing an outer tubular member and a separate insert within the tubular member. The insert forms shoulders again which deformable members may directly or indirectly bear to permit radially expanding the deformable members to frictionally connect the tubing sections. It has been found much cheaper to provide the necessary shoulder on a separate insert than to swage or counterbore as has been done heretofore. The insert may be constructed, for example, of an inexpensive plastic material and then telescoped within the tubular member.

The insert must not block flow through the tubular member and thus the insert at least partially defines a passageway therethrough. The insert is preferably in the form of a sleeve with the end surfaces thereof defining the shoulders.

The first and second deformable members are positionable within the tubular member adjacent the shoulders of the insert. First and second compression members are also provided t least partially within the tubular member for urging the first and second deformable members, respectively, against the first and second shoulders of the insert. The compression members and the deformable members preferably circumscribe the tubing sections. When the compression members are forced axially inwardly, they compress the deformable members longitudinally to thereby radially expand them into tight frictional contact with the outer surfaces of the tubing sections. Preferably, the deformable members are also expanded radially into contact with the inner surface of the tubular member to thereby form a tight seal between the tubing sections and the tubular member.

The present invention facilitates coupling of the tubing sections and eliminates the need for threaded parts by providing interlocking means on the compression members and the tubular member responsive to relative axial movement between the compression members and the tubular member to lock the compression members to the housing. Such locking action occurs when the deformable members are radially expanded to thereby frictionally retain the tubing sections within the sleeve. The interlocking means also serves to retain the compression members and deformable members within the sleeve.

The interlocking means advantageously include one or more radially extending fingers on the compression member and apertures in the tubular member into which the fingers can be lockingly received. If two or more of the fingers and apertures are provided, the apertures and/or fingers can be axially offset to thereby permit locking of the compression members to the sleeve at different relative axial positions.

In accordance with another embodiment of the invention the time required to couple the tubing sections is further reduced. The present invention teaches that this result can be accomplished if the parts of the coupling within the tubular member are slidable therewithin. One end of the tubular member is provided with a fixed abutment and the other end of the tubular member is provided with a movable abutment. By moving the movable abutment axially inwardly, the internal parts of the coupling slide within the tubular member against the fiixed abutment. By continuing such movement of the movable abutment, the deformable members are radially expanded as described above, to tightly frictionally grip the two tubing sections. Thus, by moving only one abutment member, the coupling can be caused to tightly interconnect two tubing sections. In the preferred form of the invention, the fixed abutment is integral with the sleeve.

The invention, both as to its organization and method of operation together with further features and advantages thereof may best be understood by reference to the following description taken in connection with the accompanying illustrative drawing.

BRIEF DESCRIPTION OF THE DRAWINGS

FIG. 1 is an elongated sectional view of two tubing sections interconnected by a first form of coupling constructed in accordance with the teachings of this invention.

FIG. 2 is an exploded sided elevational view of one end portion of the coupling.

FIG. 3 is a side elevational view partially in section of two tubing sections and a second form of coupling constructed in accordance with the teachings of this invention.

FIG. 4 is an enlarged sectional view taken along line 4—4 of FIG. 3.

FIG. 5 is a side elevational view of a third form of the present invention.

DESCRIPTION OF THE PREFERRED EMBODIMENT

Referring to the drawings and in particular to FIG. 1 thereof, reference number 11 designates a coupling constructed in accordance with the teachings of this invention. In the embodiment illustrated, the coupling 11 connects two tubing sections 13 and 15. Although the coupling 11 may be used in many different environments, in the embodiment illustrated, the coupling 11 and the tubing sections 13 and 15 are embedded in a block of concrete 17.

It is common practice in the construction of large concrete dams, to pour the concrete in numerous blocks or sections. Because these blocks contain huge quantities of concrete, it is necessary to position tubing in the form prior to pouring the concrete. After the concrete is poured, water is circulated through the tubing to speed up the curing of the concrete.

The tubing thus embedded in the concrete is quite long and is made up of numerous tubing sections which may be interconnected with fluid-tight couplings. The couplings 11 illustrated in FIG. 1 is particularly adapted for this service; however, it must be clearly understood that the coupling 11 may be used in other environments for the purpose of joining an elongated member to another object. Thus, in the embodiment shown in FIG. 1, the concrete 17 forms a portion of a concrete dam and the tubing sections 13 and 15 may be constructed of a lightweight material such as aluminum.

The coupling 11 generally includes an outer tubular member or sleeve 19, a separate insert 21, two deformable rings 23 and 23a and two compression members 25 and 25a. The rings 23 and 23a are identical, and the compression members 25 and 25a are identical. Accordingly, only the left-hand ring 23 and compression member 25 are discussed in detail.

The sleeve 19, in the embodiment illustrated, is an elongated cylindrical member having a surface 26 defining a cylindrical passageway 27. The sleeve 19 is preferably constructed of relatively strong material such as steel or a strong plastic.

The insert 21 is a separate member and during the assembly of the coupling 11 is telescoped within the sleeve 19. The insert 21 provides shoulders 29 and 29a. The shoulders 29 and 29a are preferably annular and accordingly, the shoulders can be most conveniently provided by the opposite end surfaces of the insert 21. It is important that the insert 21 not completely block the flow of fluid through the passageway 27 of the sleeve 19, and accordingly, in the embodiment illustrated, the insert 19 has a cylindrical passageway 31 extending therethrough. Although the insert 21 may have numerous configurations, it has been found most convenient to construct the insert 21 in the form of a cylindrical sleeve, sized to be slidably received in the passageway 27.

Although various material can be used for the insert 21, it is important that the insert be capable of withstanding some axial compression forces. It is also desirable that the insert 21 be inexpensive, lightweight and easy to construct. Accordingly, in the embodiment illustrated, the insert 21 is constructed of a rigid plastic material.

In the form shown in FIG. 1, it is preferred to permanently retain the insert 21 within the sleeve 19. To accomplish this function, the sleeve 19 has one or more integral dimples 33 which extend radially inwardly to tightly grip the insert 21. These dimples 33 can be rapidly formed by striking the outer surface 19 with a suitable punch.

The rings 23 and 23a are constructed of a resilient deformable metal such as rubber. The rings 23 and 23a are sized to be slidably received in the passageway 27 of the sleeve 19 and the opening through the rings is sized to receive the tubing sections 13 and 15.

The compression members 25 and 25a are identical and are received within the opposite end portions, respectively, of the sleeve 19. The compression members are movable axially toward each other within the passageway 27 to axially compress the rings 23 and 23a to thereby radially expand such rings into tight frictional contact with the outer surface of the tubes 13 and 15 and with the inner surface 26 of the sleeve 19.

The compression member 25 has a cylindrical opening 35 therein sized to receive the tubing section 13 and terminates inwardly in an annular end face 37. The opposite end of the compression member 25 has a plurality of radially outwardly projecting resilient fingers 39. The compression members 25 and 25a are constructed of a metal which will impart some resilience to the fingers 39. In the embodiment illustrated, the fingers 39 are formed integrally with the compression member 25 by lancing the compression member inwardly along parallel cut lines 41 (FIG. 2) and by bending the portion of metal intermediate such cut lines radially outwardly. This causes the fingers to be inclined radially outwardly as they extend axially outwardly.

The wall of the lefthand end of the sleeve 19 is formed with a number of apertures 43 corresponding to the number of fingers 39 on the compression member 25 and the wall of the righthand end of the sleeve is similarly formed with apertures 43a. Surfaces 45, 45a partially define the apertures 43, 43a, respectively. The apertures 43 preferably have a circumferentially extending dimension which greatly exceeds the circumferential dimension of the corresponding fingers 39, to facilitate aligning of the fingers and apertures. The fingers 39 are bent outwardly so that the ends thereof lie substantially flush with the wall of the sleeve as shown in FIG. 1. The fingers 39 are also sufficiently resilient so that the compression member 25 and the fingers 39 may be forced within the passageway 27. The incline on the fingers 39 permits the sleeve 19 to cam the fingers inwardly. As the compression member 25 moves axially inwardly within the passageway, it compresses the ring 23 and ultimately the fingers 39 come into registry within the apertures 43 at which time they snap radially outwardly into the apertures. In this position, the outer ends of each of the fingers 39 bears against a surface 45 of the aperture 43 to prevent movement of the compression member 25 axially out of the passageway 27. The resilient ring 23 urges the compression member 25 outwardly so that the outer ends of the fingers 39 bears against the surfaces 45.

In order that the ring 23 may be axially compressed and radially expanded varying amounts, the surfaces 45 of the adjacent apertures 43 are axially offset an amount X as shown in FIG. 2. In the embodiment illustrated, the apertures 43 are of equal size and some of them are axially offset. The apertures 43a are similarly constructed.

In use of the coupling 11, the rings 23 and 23a and compression members 25 and 25a are telescoped over their respective tubing sections 13 and 15. The sleeve 19 with the insert 21 fixed thereto is then telescoped over the end portions of the tubing sections 13 and 15. With the components of the coupling 11 thus positioned, the compression members 25 and 25a are moved axially toward each other by an appropriate tool (not shown). This causes the rings 23 and 23a to be axially compressed between the shoulders 29, 29a and the compression members 25, 25a. By continuing to move the compression members 25 and 25a axially inwardly, the fingers 39 eventually snap into the apertures 43 and 43a respectively. If additional compression of the rings 23 and 23a is desired, the compression members 25, 25a are moved toward each other an additional amount to permit the outer ends of other of the fingers 39 to be received in the corresponding apertures 43, 43a which are located axially inwardly.

As the rings 23, 23a are constructed of resiliently deformable material, the axial compression thereof results in radial expansion of the rings. In the radially expanded condition, the rings tightly engage the inner surface 26 of the sleeve 19 and the outer surfaces of their respective tubing sections 13 and 15. The rings 23 and 23a perform two functions, namely, to retain the tubing sections within the sleeve 19 and to form a fluid tight seal between the tubing sections and the sleeve 19. The tubing sections 13 and 15 may be inserted into the passageway 27 so that they are axially spaced as shown in FIG. 1 or so that they are in contact with each other. Preferably the shoulders 29 extend axially outwardly as they extend radially outwardly. With the shoulders 29 and 29a inclined in this manner, they direct the radial expansion of the rings 23 and 23a toward the tubing sections 13 and 15.

With reference to FIGS. 3 and 4, a second form of coupling 47 is illustrated as interconnecting tube sections 49 and 51. The coupling 47 is particularly adapted for use as a repair coupling in connecting tubing for concrete dam construction, although many other uses thereof are possible. The primary advantage of the coupling shown in FIGS. 3 and 4 as compared with the coupling 11 is that the former can be completely assembled and installed by merely joining two members together.

The coupling 47 generally includes an outer tubular member of sleeve 53, a separate insert 55, identical resilient deformable rings 57 and 57a, compressive members 59 and 59a and a nut 61. All of the coupling components within the sleeve 53 are slidable within the sleeve. The sleeve 53, except for the end portions thereof may be identical to the sleeve 19 and includes an innear surface 63 defining a cylindrical passageway 65 therein. The righthand end portion of the sleeve 53 has external threads for receiving the nut 61 and the lefthand end portion of the sleeve has wall portions 65 and 67 (FIG. 4) which are deformed radially inwardly to define a fixed abutment 69 (FIG. 3). To form the wall portions 65 and 67, the sleeve 53 is cut circumferentially along opposed cut lines 71 which do not extend completely circumferentially around the sleeve. With the sleeve 53 cut in this manner the wall portions 65 and 67 can be deformed inwardly as shown in FIG. 4. The wall portions 65 and 67 are pushed inwardly to the extent required to locate the abutment for engagement with the compression member 59. The wall portions 65 and 67 are curved and spaced to permit insertion of the tubing section 49 into the passageway 63.

The insert 55, which may be identical to the insert 21, has shoulders 73, 73a at the opposite ends thereof and a cylindrical passageway extending therethrough. The deformable rings 57, 57a may be identical to the rings 23, 23a.

The compression members 59, 59a differ from their counterparts in the coupling 11 in that they are in the form of axially short sleeve members and have no fingers thereon. The nut 61 may be constructed of a relatively strong metal such as steel and includes a circumferentially extending, inwardly directed flange 75.

To install the connector 47, the sleeve 53, the compression member 59, the ring 57, the insert 55, the ring 57a and the compression member 59a are telescoped over the tubing section 49 in the order above cited. The nut 61 is telescoped over the tubing section 51 and the two end portions of the tubing sections 49, 51 are then brought into axial alignment. With the ends of the tubing sections 49 and 51 centered within the coupling 47, the nut 61 is tightened to cause the flange 75 thereby to bear against the compression member 59a. As the nut 61 is tightened, the flange 75 moves axially inwardly to slide all of the other members of the coupling within the sleeve 53 to the left until the compression member 59 engages the abutment 69. Continued tightening of the nut 61 causes the axial compression and radial expansion of the rings 57 and 57a in the manner described in connection with FIGS. 1 and 2 to frictionally retain the tubing sections within the sleeve 53.

A primary advantage of the coupling 47 is that it can be assembled by merely turning the nut 61 onto the sleeve 53. The flange 75 forms a movable abutment which is movable axially to accomplish the function of squeezing the rings 57 and 57a. It is important therefore that all of the components of the coupling 47 within the sleeve 53 be axially slidable in the passageway 65. Accordingly, the insert 55 is not permanently affixed to the sleeve 53 but is retained within the sleeve between the rings 57 and 57a.

A coupling 77 which represents a third form of the present invention is illustrated in FIG. 5. The coupling 77 is identical to the coupling 47 except that there is no fixed abutment 69 and two nuts 79 and 81 are provided. The nut 81 forms a movable abutment and replaces the fixed abutment 69 of FIGS. 3 and 4. The right half of the coupling 77 is identical to the right half of the coupling 47, and the coupling 77 is symmetrical about a central radial line so that the details of the left half thereof are the same as the right half. The coupling 77 includes a sleeve 83 for receiving and interconnecting tubing sections 85 and 87, a separate insert, and two deformable compression members which may be identical to the insert 55, the rings 57 and 57a, and the compression member 59a, respectively. As the nuts 79 and 81 provide two movable abutments for moving the compression members thereof axially inwardly, the insert of the coupling 77 can be permanently affixed to the sleeve, if desired.

Although exemplary embodiments of the invention have been shown and described, many changes, modifications and substitutions may be made by one having ordinary skill in the art without necessarily departing from the spirit and scope of this invention.

We claim:
1. A connector for joining a tube to a second member comprising:
 a tubular member having an inner surface defining a passageway extending therethrough, said passageway having first and second ends and being adapted to receive a portion of the tube, said tubular member being connectible to the second member;
 a separate insert member within the passageway of the tubular member, said insert member being at a location within said passageway in which a first portion of the tubular means lies on one side of the insert member and a second portion of the tubular means lies on the other side of the insert member, said insert member defining a shoulder and at least partially defining passage means for providing communication between said first and second portions of said tubular member;
 the passageway of the tubular member being of sufficient cross sectional area to permit the insertion of said insert member through said first end of said tubular member and movement of the insert member within said passageway to said location;
 means for retaining said insert member within said tubular means substantially at said location;
 a deformable member within said tubular means, said deformable member being supportable by said shoulder and engageable with the wall of said portion of the tube; and
 means for urging said deformable member toward said shoulder to squeeze the deformable member generally axially to thereby radially expand the deformable member into tight frictional contact with the wall of said portion of the tube to connect the tube to the tubular member.

2. A combination as defined in claim 1 wherein said last mentioned means includes quick connect means responsive to relative axial movement between said housing and said quick connect means for automatically locking said quick connect means to said housing to thereby retain the deformable member in a radially expanded condition.

3. A coupling as defined in claim 1 wherein said means for retaining said insert member within said tubular member includes an inwardly extending deformation formed integrally with said tubular member and engaging said insert member.

4. A connector as defined in claim 1 wherein said insert member is constructed of a plastic material and said tubular member is constructed of metal.

5. A connector as defined in claim 1 wherein said tubular member is an integral member devoid of a circumferentially extending joining seam.

6. A connector as defined in claim 1 wherein said deformable member is generally tubular and said last mentioned means includes a generally tubular compression member for urging said deformable member toward said shoulder and an annular threaded member mounted on said tubular member and having an annular surface engageable with said compression member to urge the latter toward said shoulder.

7. A coupling for joining first and second tubing sections comprising:
an outer tubular member having an inner surface defining a passageway extending therethrough, said passageway being adapted to receive end portions of the first and second tube sections, respectively;
a tubular insert telescoped within said tubular member, said insert having passage means extending therethrough and a circumferentially extending shoulder exposed within said passageway of said outer tubular member, said insert having an outer peripheral surface generally confronting the inner surface of the tubular member;
means for connecting the second tubing section to the outer tubular member;
an element constructed of resilient deformable material, said element being positionable within said outer tubular member adjacent said shoulder of said insert and being adapted to receive the first tubing section therein;
a compression member at least partially within said outer tubular member for urging said element toward said shoulder of said insert to longitudinally compress said element between said compression member and said shoulder and to radially expand said element into contact with the first tubing section; and
means for retaining said compression member at least partially within said outer tubular member, said last mentioned means including an aperture in one of said members and a projection on the other of said members receivable within the aperture.

8. A coupling as defined in claim 7 wherein said aperture is in said outer tubular member and said projection is on said compression member.

9. A coupling as defined in claim 7 wherein said last mentioned means includes first and second apertures in the wall of said tubular member and first and second radially extending fingers on said compression member receivable in the first and second apertures, respectively, said apertures being axially offset from each other to permit interlocking of the compression member to the tubular member at least at two axially spaced positions.

10. A connector as defined in claim 7 wherein the cross section of said passageway between one end thereof and the remote end of said insert is of substantially uniform cross section and of sufficient size to receive said insert.

11. A coupling for joining first and second tubing sections comprising:
a one-piece tubular member having a passageway therethrough and first and second ends, said passageway being of substantially uniform cross section throughout susbtantially the full length thereof;
an insert member having a passageway therethrough, said insert member being positioned in said passageway of the tubular member with the insert member defining a shoulder in said passageway of said tubular member, said shoulder facing said first end;
means for retaining said insert member within said tubular member;
a deformable member in the passageway of the tubular member intermediate said shoulder and said first end, the first tubing section being insertable into the passageway of the tubular member so that at least a portion of the first tubing section lies radially inwardly of the deformable member;
means for urging the deformable member toward said shoulder to radially expand the deformable member into snug engagement with the first tubing section to thereby join the first tubing section to the tubular member; and
means for connecting the tubular member to the second tubing section.

12. In a coupling for joining first and second tubing sections, the combination of:
an outer tubular member having an inner surface defining a passageway therethrough, said passageway being adapted to receive end portions of the first and second tubing sections therein;
insert means slidable generally axially within said passageway in said outer tubular member, said insert means leaving said passageway in said outer tubular member unblocked and providing first and second circumferentially extending shoulders;
first and second generally tubular deformable elements slidable within the passageway of said outer tubular member and supportable by said first and second shoulders, respectively, said first and second tubing sections being receivable in said first and second deformable elements, respectively;
fixed abutment means adjacent one end of said tubular member; and
movable abutment means adjacent the other end of said tubular member, said movable abutment means being movable toward said fixed abutment means to urge said insert means and said first and second deformable elements toward said fixed abutment means to cause said fixed abutment means to support said element and said insert means, further movement of said movable abutment means toward said fixed abutment means axially compressing and radially expanding both of said deformable elements into tight frictional contact with the first and second tubing sections, respectively.

13. A connector as defined in claim 1 wherein said shoulder is a first shoulder and faces said first end of the tubular member, said insert member defining a second shoulder facing said second end of said tubular member, said deformable member is a first deformable member positioned between said first shoulder and said first end, and including a second deformable member positioned between said second shoulder and said second end, at least a portion of said second member being positionable in said passageway of said tubular member radially inwardly of said second deformable member, and means for urging said second deformable member toward said second shoulder to radially expand the latter into engagement with the second member, each of said means for urging including a compression member for urging the associated deformable member against its associated shoulder the passageway of the tubular member being of sufficient cross sectional area to permit insertion of the deformable members and the compression members through at least one end of the passageway of the tubular member and movement of the deformable members and the compression members in said passageway of said tubular member to their respective positions therein.

14. A connector as defined in claim 12 wherein the passageway of the tubular member between said fixed abutment means and said other end of the tubular member is of sufficient cross sectional area to receive said insert means and said deformable elements.

15. A combination as defined in claim 12 wherein said fixed abutment means is integral with said outer tubular member.

16. A combination as defined in claim 12 wherein said fixed abutment includes a wall portion of said outer tubular member adjacent said one end thereof, said wall portion being deformed radially inwardly to at least partially define said fixed abutment means.

References Cited

UNITED STATES PATENTS

| | | | |
|---|---|---|---|
| 740,004 | 3/1903 | Gillespie | 285—356 X |
| 922,805 | 5/1909 | Nelson et al. | 285—238 |
| 2,478,127 | 8/1949 | Parker | 285—356 X |
| 2,537,284 | 1/1951 | Schuder | 285—417 X |
| 2,747,900 | 5/1956 | Smith | 285—369 X |
| 2,900,200 | 8/1959 | Umstadter | 285—369 X |
| 3,432,187 | 3/1969 | Mooney et al. | 285—55 |

REINALDO P. MACHADO, Primary Examiner

W. L. SHEDD, Assistant Examiner

U.S. Cl. X.R.

285—369, 232, 346, 356